United States Patent [19]

Sauer

[11] 4,075,918
[45] Feb. 28, 1978

[54] ROTARY ANVIL COVER
[75] Inventor: Louis E. Sauer, St. Louis, Mo.
[73] Assignee: L. E. Sauer Machine Company, St. Louis, Mo.
[21] Appl. No.: 672,648
[22] Filed: Apr. 1, 1976

Related U.S. Application Data
[63] Continuation of Ser. No. 515,520, Oct. 17, 1974, abandoned, which is a continuation-in-part of Ser. No. 372,423, Jun. 21, 1973, abandoned.

[51] Int. Cl.² ............................................. B26D 7/20
[52] U.S. Cl. ...................................... 83/659; 83/347
[58] Field of Search ..................... 83/659, 346, 347; 29/130; 101/415.1

[56] References Cited
U.S. PATENT DOCUMENTS

| 3,577,822 | 5/1971 | Sauer et al. | 83/659 |
| 3,739,675 | 6/1973 | Duckett et al. | 83/659 |

*Primary Examiner*—Frank T. Yost
*Attorney, Agent, or Firm*—Rigers, Eilers & Howell

[57] ABSTRACT

A cover for a rotary anvil which includes in combination, a main body of flexible material having ends with alternating lugs and recesses adapted to interlock with one another, and a comparatively inelastic reinforcing sheet of metal or the like attached to the inner surface of the main body and having ends adapted to meet or overlap when the ends of the main body are interlocked, one end of the reinforcing sheet protruding from the lugs of its associated main body end so that the meeting of the reinforcing sheet ends does not coincide with the interlocking surfaces of the lugs and recesses. A shim member may be provided on the inner surface of the reinforcing sheet and extending circumferentially a sufficient distance to underlie the interlocking surfaces of the lugs and recesses to there raise the cutting surface of the cover. Axially spaced, circumferentially disposed ribs may be attached to the inner surface of the reinforcing sheet and the shim member for mounting on an appropriately grooved base anvil member.

25 Claims, 5 Drawing Figures

U.S. Patent    Feb. 28, 1978    Sheet 1 of 2    4,075,918
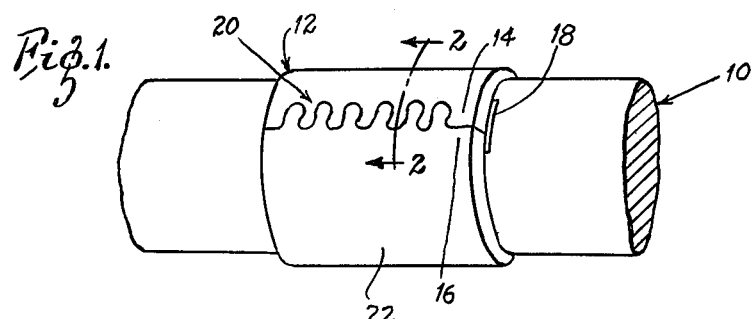
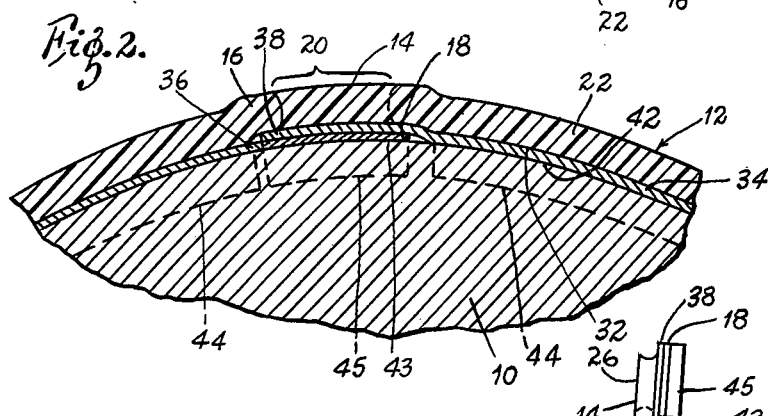
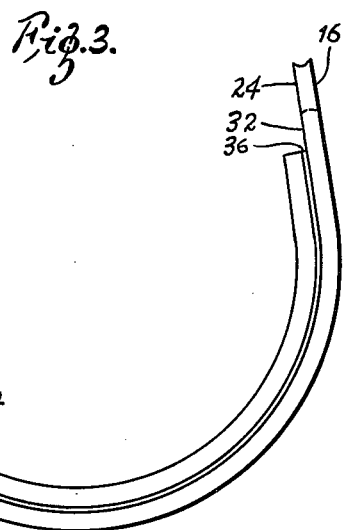
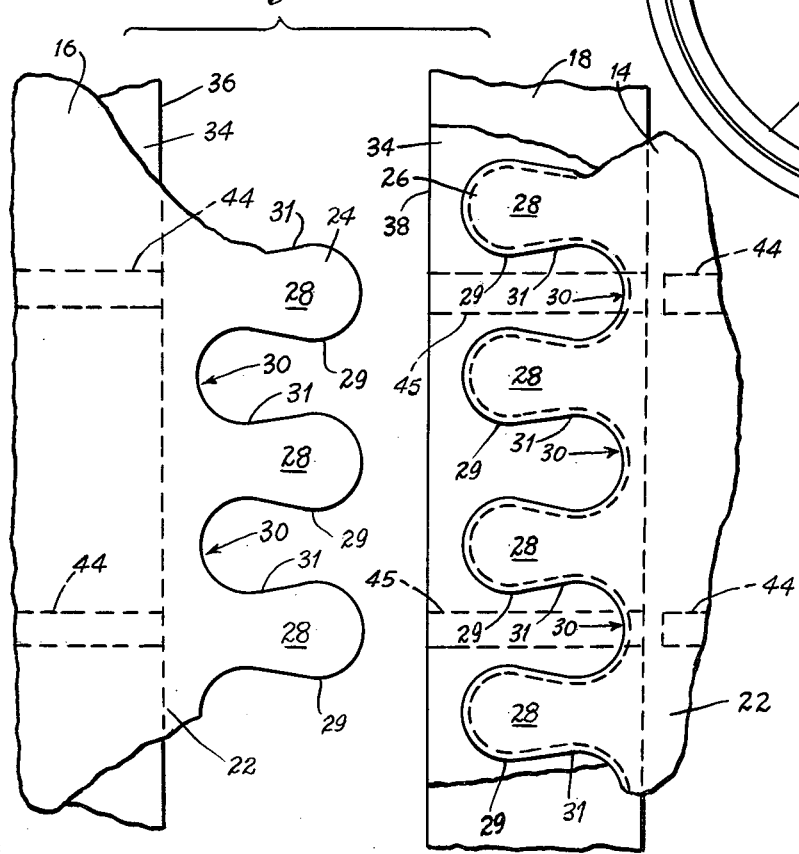

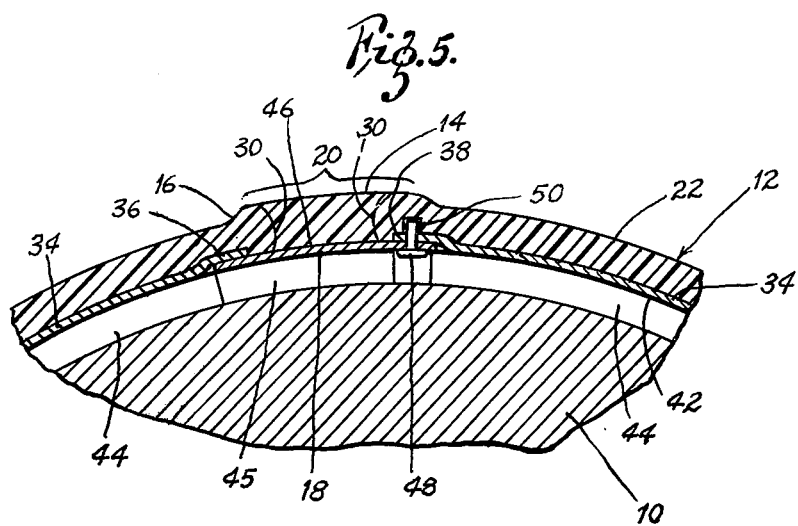

ROTARY ANVIL COVER

This is a continuation of application Ser. No. 515,520 filed Oct. 17, 1974, now abandoned, which application was a continuation-in-part of application Ser. No. 372,423 filed June 21, 1973, now abandoned.

The present invention relates generally to rotary die cutting for the manufacture of corrugated boxes and the like, and more particularly to a cover member for a rotary anvil.

In the field of rotary die cutting, corrugated board or other material to be cut is fed into the nip of a pair of rotating rollers wherein one roller is equipped with radially extending cutting edges and the other roller (the "anvil") is equipped with a surface upon which the cutting edges of the die may bear during the cutting operation. The surface of the anvil preferably is a replaceable cover of resilient material such as polyurethane plastic and the like. Resilient anvil covers may be made in a continuous circle, the cover being pushed longitudinally upon the anvil base (as a ring is placed on a finger). However, it has been found desirable from the standpoint of mounting an anvil cover on a base anvil member to employ a cover which may be wrapped around the base member and locked in place, thereby permitting the said cover to employ circumferentially disposed ribs extending radially inward to engage appropriately positioned circumferential grooves in the surfaces of the support member. Anvil covers of this type may be provided in a single length (the two ends thereof being adapted to interlock when the cover is mounted on the base anvil member), or may be provided in two or more pieces, the ends of which may similarly interlock. A successful interlocking system is shown in U.S. Pat. No. 3,522,754 wherein mating ends of the anvil cover are provided with alternating lugs and recesses. In mounting an anvil cover of this type upon a support, the cover is wrapped upon the support and the interlocking ends are merely pressed together to provide a strong seam. It has been found generally that axial and circumferential deformation of anvil covers of the type described can be reduced by employing in the anvil cover a reinforcing sheet of fiber board or the like.

It is desired that an anvil cover be capable of withstanding many thousands of cutting operations before replacement thereof is necessary. Further, it is desired that the entire surface of the anvil cover be available for use, including the area wherein the seam between connecting cover ends is located.

It has been found that the anvil cover where the lugs and recesses interlock to form a seam tends to require a deeper penetration of the cutting edges of the die to achieve cutting. This is caused by the fact that the recesses between the lugs weaken the cover at the location of the lugs, whereby the resistance of the cover in this location to longitudinal and circumferential deflection is reduced. Further, since the reinforcing sheet of fiber board or the like ordinarily does not extend into the area of interlocking lugs and recesses, axial and circumferential stresses are pronounced in this area.

It is, hence, an object of the present invention to provide a cover for a rotary anvil which includes a reinforcing sheet to oppose longitudinal and circumferential stresses throughout substantially the entirety of its area.

It is another object of the invention to provide a cover member for a rotary anvil wherein the surface of the cover in the area of interlocking lugs and recesses requires the same depth of penetration of the cutting edges of the die as the remainder of the surface of the cover.

It is another object of the invention to provide a one piece cover for a rotary anvil which is easily installed and removed and which has a surface which is highly resistant to wear at seams therein, and which is reinforced against axial and circumferential stresses throughout substantially its entire area It is a further object of the invention to provide a method for producing a cover for a rotary anvil wherein the lugs and recesses of one end thereof are bonded to and supported by a reinforcing sheet and are formed through selective placement of bonding and release agents on said sheet.

Briefly, the present invention in one embodiment relates to a cover for a rotary anvil. The cover comprises, in combination, a. a main body of flexible material having two ends with alternating lugs and recesses. The latter are adapted to interlock with one another along a line substantially coaxial with the anvil.

b. a reinforcing sheet of metal or the like attached to the inner surface of the main body. The reinforcing sheet has two ends associated respectively with the ends of the main body and which are adapted to substantially meet or overlap when the ends of the main body are interlocked. One end of the reinforcing sheet protrudes from the lugs of its associated main body end.

In a preferred embodiment, the cover includes a shim member attached to the inner surface of the reinforcing sheet adjacent its protruding end. The shim member is of sufficient circumferential dimension as to extend beneath the interlocking surfaces of the lugs and recesses. It is also preferred that the cover include axially spaced, circumferentially disposed ribs attached to the inner surface of the reinforcing sheet. The ends of the ribs may terminate short of the shim member or may extend up to the shim and substantially abut with cooperating ribs placed on the shim. The shim may be sized to substantially abut with the recessed end of the reinforcing sheet or may extend beneath and overlap the recessed end or both ends of the reinforcing sheet.

The invention in another embodiment relates to a method for producing a rotary anvil cover having a resilient main body and an inner reinforcing sheet. A reinforcing sheet of metal or the like is provided, and to the surface thereof is applied a bonding agent adapted to adhere the main body thereto, with the proviso that at one end of the sheet, a release agent is applied to areas thereof associated with recesses in the main body. The body is adhered to the sheet, with the end of the sheet bearing release agent protruding from its associated end of the main body. Alternating lugs and recesses are then cut in the main body ends.

IN THE DRAWING:

FIG. 1 is a perspective view of an anvil containing a cover of the invention;

FIG. 2 is a cross-sectional view taken along the lines of 2-2 of FIG. 1 and shown partially broken away;

FIG. 3 is an end view of an anvil cover of the invention prior to assembly about an anvil support, depicted with exaggerated thickness for clarity;

FIG. 4 is a plan view of the ends of an anvil cover of the invention ready for assembly by means of interlocking lugs and recesses about an anvil support.

FIG. 5 is a cross-sectional view similar to FIG. 2 showing an overlapping shim;

Referring now to FIG. 1, an anvil base member 10, such as that depicted in U.S. Pat. No. 3,522,754, is provided about its circumference with an anvil cover of the invention 12 having interlocking ends 14 and 16. Visible in FIG. 1 is a shim member 18 which is disposed inwardly of the cover 12 and which extends circumferentially of the cover so as to underlie the seam 20 between interlocking ends 14 and 16 so as to raise the outer surface of the mounted anvil cover slightly in that area including the seam 20, as is shown best in FIG. 2. The drawing depicts an anvil cover in one piece; it must be understood, of course, that if desired the cover may be provided in two or more pieces.

The end portions of the anvil cover are shown best in FIGS. 3 and 4. As there depicted, the cover includes an outer layer or sheet 22 or resilient, flexible material such as a polyurethane plastic, the ends 24 and 26 of which are shaped into alternating lugs 28 and recesses 30 which are adapted to interlock with one another as shown in FIG. 1. The lugs are preferably of the teardrop shape shown in FIG. 4, wherein the lugs and recesses are of substantially the same configuration. Lugs and recesses which are generally T-shaped or wedge-shaped are also acceptable, as are other configurations. As thus described, the ends of the cover may be wrapped about a base anvil member and then pressed into interlocking relationship. Service circumferential stretching of the cover to permit interlocking is not required. The lugs and recesses need not be of the same configuration, but the mating surfaces thereof should interfit closely so as to provide a substantially smooth cutting surface upon which the knife edges of the cutting roller may bear. To provide locking between lugs and recesses, the ends 29 of the lugs will normally be wider than the mid-portions 31 thereof, and should closely fit the correspondingly shaped recesses.

Cemented or otherwise attached to the inner surface 32 of the flexible body 22 is a reinforcing sheet 34 of sufficient length so that the ends 36 and 38 thereof meet when the lugs and recesses have been interlocked with one another. The end 38 of the reinforcing sheet which is associated with the end 14 of the flexible outer layer 22 protrudes a short distance outwardly from the ends of lugs 28. The other end 36 of the reinforcing sheet terminates short of the recesses 30 of its associated main body end 16. Thus, the meeting of ends 36 and 38 of the reinforcing sheet is offset from the seam 20 between the lugs 28 and the recesses 30 of the ends of the flexible outer layer 22. In this embodiment, the circumferential stresses in the main body occurring where the ends of the reinforcing sheet meet does not coincide with the seam 20 between the interlocking lugs and recesses where such stresses would be most likely to be troublesome. The lugs 28 of the end 26 of the outer flexible layer are themselves cemented to the reinforcing sheet 34, thus reinforcing these lugs (and the lugs of the opposing end 24) against axial and circumferential stresses.

Attached to the inner surface 42 of the reinforcing sheet 34 adjacent the protruding end 38 of the latter is a shim member 18, which may be metal or the like. The function of the shim member is to elevate slightly the outer surface of the main body in the area of the seam 20. Such elevation has been found to make the depth of penetration of the cutting edges of the die to achieve cutting, in the vicinity of the seam 20, the same as is required over the balance of the cover, and thus produce even cutting. The shim member 18 may be attached to the inner surface 32 of the reinforcing sheet by means of a suitable cement or the like.

In a preferred embodiment, the inner surface 42 of the reinforcing sheet 34 is provided with inwardly extending, axially spaced ribs 44 (shown in dashed lines in FIGS. 2 and 4), the ribs being formed for insertion in circumferential grooves (not shown) in the outer surface of the anvil base member 10, and may be of the configuration known to the art and described, for example, in U.S. Pat. Nos. 3,274,873 and 3,363,496. Since the primary function of the ribs is to restrain the anvil cover from axial movement on the anvil base, such ribs (and the corresponding grooves in the anvil base member) may be substantially rectangular in cross-section rather than undercut as shown in the aforementioned patents. A rectangular rib configuration permits the cover to be wrapped easily about the outer surface of the anvil base member when the cover is to be mounted on the base. The inner surface 43 of the shim member may likewise be provided with rib members 45, the latter being the same radial dimension as ribs 44 to support the bulging of the cover in the area of the seam 20. The ribs of the anvil cover may be made to slip in the slots provided for them in the anvil base member, thus enabling the anvil cover to turn circumferentially in the anvil cover base when under the stress exerted by the cutting edges of the die.

FIG. 5 shows a modified shim adapted to overlap both ends of the reinforcing sheet 34. As shown, both ends 36 and 38 of the reinforcing sheet 34 terminate short of recesses 30 of seam 20. Shim 18 overlaps end 38 and is attached thereto by adhesive 46 and rivets 48. Shim 18 extends beneath and overlaps free end 36 of reinforcing sheet 34. The overlap between shim 18 and ends 36 and 38 will typically be about one-fourth of an inch (6 mm). Ribs 44 on inner surface 42 of the reinforcing sheet 34 extend up to and substantially abut ribs 45 on shim 18, as shown. Ribs 44 and 45 will be of substantially the same dimensions, as shown. The material 22, at ends 14 and 16, of cover 12 may be thickened in the area of seam 20 by an amount equal to the thickness of reinforcing sheet 34, as shown. As a result, the thickness of shim 18 elevates the area of seam 20 when the cover 12 is installed on a cutting anvil.

Typically, the main body and reinforcing sheet of an anvil cover of the invention may be three-eighths inch thick and 0.020 to 0.058 inches thick, respectively. The shim member may be 0.020 to 0.058 inches in thickness. The anvil cover may be ten inches wide (measured axially) and may be of sufficient circumferential length as to interlock about a base anvil member to provide a covered anvil about eighteen inches in diameter. The circumferential width of the seam 20 may be approximately one inch.

The anvil cover of the invention may be produced by coating a sheet with a bonding agent. For the embodiment shown in FIGS. 1–4, the bonding agent is provided only in those areas corresponding to lugs of the associated end of the resilient main body, those areas corresponding to recesses being coated instead with a release agent. If desired, the bonding agent and/or release agent may be printed on the surface of the reinforcing sheet, or may be applied by means of a stencil or the like. The reinforcing sheet is then mounted in an annular mold, with the non-coated surface of the sheet supported against the inner annular surface of the mold. The reinforcing sheet may be pulled against the mold with narrow (e.g., one-half inch) metal bands about its circumferential periphery and extending outwardly from the ends to provide convenient projections for holding the sheet in place. The bands may be narrowed for a short distance adjacent the ends of the sheet to afford "break-off" points whereby the band extensions may be broken off following molding. A resin such as a polyurethane is then introduced into the mold between the exposed surface of the reinforcing sheet and the outer annular mold surface. When the resin has hardened, the resulting product which includes the reinforcing sheet and the resilient main body bonded thereto may be removed. The ends of the resilient main body are then cut in predetermined fashion to from the lugs and recesses depicted in FIG. 4, end 14 of the main body being cut generally along the line defined by the junction between bonding and release agents. In FIG. 4, the dashed line 33 approximately conicdent with the outline of lugs 28 represents the junction between bonding and release agents as the same were applied to the end 38 of the reinforcing sheet.

If desired, the inner annular surface of the mold may be provided with circumferential grooves therein for reception of additional polyurethane plastic to form ribs 44. The shim member 18 is preferably added after the molding operation (unless the mold is adapted to account for the increased thickness of the shim), and may be attached to the underside of the reinforcing sheet by spot welding, by use of a suitable adhesive, and the like. Circumferential ribs 44 may terminate slightly short of the area covered by shim member 18 or may substantially abut ribs 45 on shim 18. Rivets 48 may be added by drilling blind holes 50 through the bonded shim 18 into the cover 12 through reinforcing sheet 34 at the end of each rib 44. Poprivets 48 are then inserted through the holes and fixed in place.

Resilient materials for use as anvil covers are known to the art, but polyurethane resins are preferred. Further, bonding and release agents suitable, respectively, for adhering or preventing adherence of polyurethane resins to metal surfaces are known in the art; examples of such agents are Chemlok #218, Hughson Chemical Co. (bonding agent) and silicon-based release agents, such as Dow Corning #107 compound. After the cut is made defining the lugs 28 in end 14 of the resilient main body, the release agent permits the waste material (corresponding to recesses in that end of the main body) to be readily stripped away.

It is understood that the foregoing description and accompanying drawing have been given by way of illustration and example, and that changes in form of the elements, rearrangement of the parts and substitution of equivalent elements, which will be obvious to those skilled in the art, are contemplated as within the scope of the present invention.

I claim:

1. In a cover for a rotary anvil, a main body of resilient material having ends with complimentary lug and recess interlocking means whereby the body may be joined to form a cover for the anvil and means adjacent the interlocking means for elevating the surface of the cover at the interlocking means, to counteract the tendency of the cover thereat to yield to compressive forces applied to the anvil to a greater degree than the yielding of the rest of the cover.

2. The rotary anvil cover of claim 1 wherein the body has a reinforcing sheet attached to its inner surface.

3. The cover of claim 2 wherein there are axially spaced circumferentially disposed ribs attached to the inner surface of the reinforcing sheet and the means for elevating the surface is a shim attached to the protruding end of the reinforcing sheet, the reinforcing sheet having axially spaced circumferentially disposed ribs attached to the inner surface of the reinforcing sheet and the shim member having axially spaced circumferentially disposed ribs and wherein the ribs on the reinforcing sheet substantially abut with and cooperate with the ribs on the shim.

4. A cover for a rotary anvil comprising a main body of resilient having two ends with alternating lugs and recesses adapted to interlock with one another along a line substantially coaxial with said anvil, a reinforcing sheet attached to the inner surface of the said main body having two ends associated respectively with the ends of the main body, and a shim member attached to one end of the reinforcing sheet.

5. The cover of claim 4 wherein the shim member is attached to the inner surface of the reinforcing sheet.

6. The cover of claim 4 wherein the shim member extends beyond the lugs and recesses of its associated end and is adapted to overlap the opposite end of the reinforcing sheet.

7. The cover of claim 7 wherein cooperating ends of the reinforcing sheet are adapted to substantially abut when the ends of the main body are interlocked.

8. The cover of claim 4 wherein one end of the reinforcing sheet protrudes from the lugs of its associated body end.

9. The cover of claim 8 wherein the shim is attached to the protruding end of the reinforcing sheet.

10. The cover of claim 4 wherein axially spaced, circumferentially disposed ribs are attached to the inner surfaces of the reinforcing sheet.

11. The cover of claim 10 wherein the shim member has axially spaced, circumferentially disposed ribs.

12. The cover of claim 10 wherein the ribs are adapted to slide circumferentially in cooperating circumferential grooves in the outer surface of a base anvil member about which the cover is to be mounted, whereby axial displacement of said cover with respect to the base is restrained.

13. The cover of claim 10 wherein the ribs are generally rectangular in cross section.

14. The cover of claim 10 wherein the reinforcing sheet has ribs which terminate short of the shim member.

15. The cover of claim 10 wherein the ribs substantially abut with cooperating ribs on the shim member.

16. A cover for a rotary anvil comprising a main body of resilient material having two ends with alternating lugs and recesses adapted to coact with one another to interlock the ends along a line substantially coaxial with the anvil and means to elevate the main body in the area of the lugs and recesses when the lugs and recesses are interlocked.

17. The cover of claim 16 wherein the means to elevate the main body includes a shim attached to one end of the cover at an inner surface adjacent to the lugs and recesses at that end.

18. The cover of claim 16 wherein a reinforcing sheet is attached to an inner surface of the main body and has two ends associated with the ends of the main body.

19. The cover of claim 18 wherein a shim is attached to one end of the reinforcing sheet.

20. The cover of claim 18 wherein one end of the reinforcing sheet extends beyond the lugs and recesses of its associated ends and wherein the inner surface of the sheet has circumferentially disposed ribs terminating short of the shim member and wherein the shim member has corresponding ribs.

21. The cover of claim 18 wherein the ends of the reinforcing sheet terminate inwardly from the lugs and recesses of the associated ends of the main body, wherein the shim is adapted to overlap the ends of the reinforcing sheet, wherein the reinforcing sheet and the shim have circumferentially disposed ribs on their inner surfaces, and wherein the ribs on the reinforcing member and on the shim are substantially abutting.

22. A cover for a rotary anvil comprising, in combination, a main body of resilient material having two ends with alternating lugs and recesses adapted to interlock with one another along a line substantially coaxial with said anvil, and a reinforcing sheet attached to the inner surface of said main body and having two ends associated respectively with the ends of the main body and adapted to substantially abut when the ends of the main body are interlocked, one end of the reinforcing sheet having means protruding from the lugs of its associated main body and adapted to contact the lugs of the other end of the main body.

23. The cover of claim 22 wherein the means includes a shim member attached to the inner surface of one end of the reinforcing sheet and extending beneath the interlocking surfaces of said lugs and recesses.

24. The cover of claim 22 herein the protruding means is adapted to contact the lugs of the other end of the main body.

25. The cover of claim 22 wherein the shim member overlaps the opposite end of the reinforcing sheet.

* * * * *